United States Patent Office 2,814,772
Patented Nov. 26, 1957

2,814,772

ELECTRICAL CIRCUITS USING COLD-CATHODE TRIODE VALVES

Frederick S. Goulding, Deep River, Ontario, Canada, assignor, by mesne assignments, to the United Kingdom Atomic Energy Authority, a government corporation incorporated of the United Kingdom of Great Britain and Northern Ireland Application August 19, 1952, Serial No. 305,127

3 Claims. (Cl. 323—22)

This invention relates to electrical circuits using cold-cathode valves of the type having at least an anode, a cathode and trigger electrode and hereinafter referred to as cold-cathode triode valves.

The invention resides in an amplifier circuit comprising a cold-cathode triode valve. By "amplifier circuit" is meant a circuit having a continuous characteristic as distinct from a circuit having a switching characteristic.

The amplifier circuit of the invention may be incorporated in an electrical circuit to provide voltage stabilisation facilities.

Cold-cathode triode valves have been used as relays or switches by incorporating the anode/cathode path in the circuit to be switched and the trigger electrode and either anode or cathode in a circuit controlling the switching operation. Thus, a low power source may be used to switch a high power source into some suitable load. Typical cases of the use of a valve in this manner are provided by photo-cell controlled devices in which the photo-cell is used to control a current flowing into the grid of the cold cathode valve causing it to strike and pass a current sufficient to operate an electromagnetic relay having contacts to close an electrical circuit and possibly operate a motor.

By means of the invention the usefulness of cold-cathode triode valves is substantially extended. The switching characteristic of the cold-cathode valve is utilized and it is arranged that self-repetitive or oscillatory switching conditions are set up and the frequency of this switching is controlled by the size of the input signal to the trigger grid of the cold-cathode triode valve.

A further step in the invention comprises the use of the reference voltage provided by the trigger grid striking potential so that the type of amplifier disclosed above may function in a parallel voltage stabiliser. In this arrangement the quality of stabilisation depends, amongst other things, on the stability of the reference voltage and with the recent development of cold-cathode triode valves having "keep-alive" electrodes improved stability may be obtained.

Figure 1:
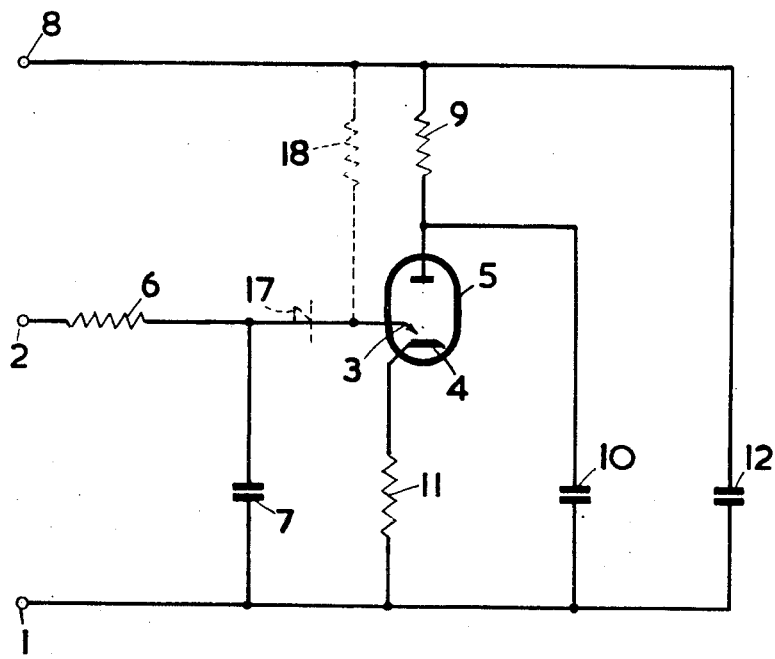
Figure 2:
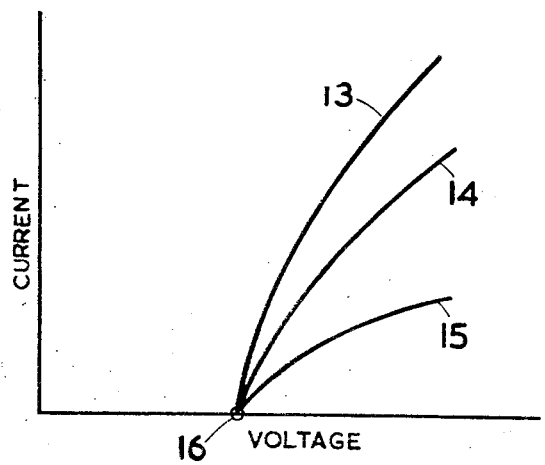
Figure 3:
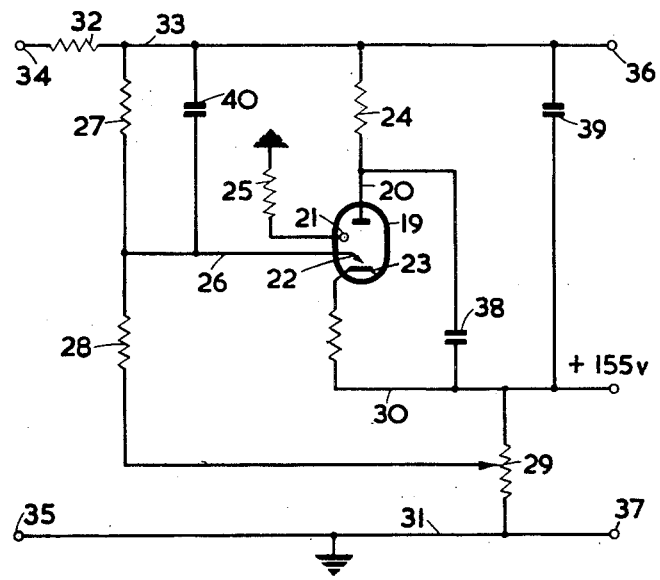
Figure 4:
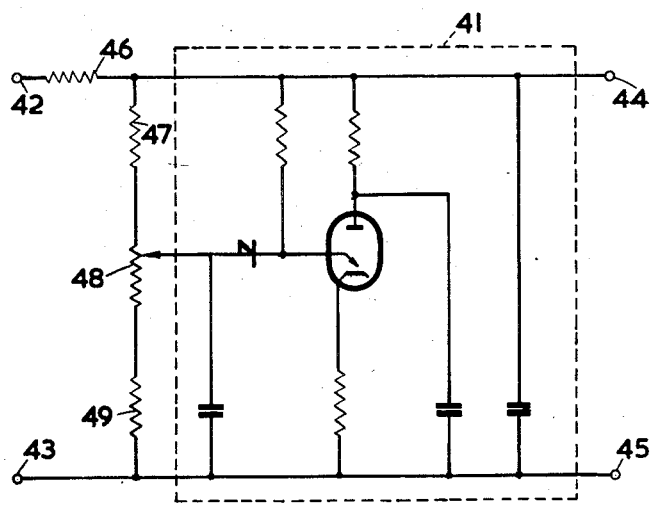

The invention is further described with reference to the embodiments disclosed in the drawings wherein Fig. 1 is the basic circuit of an amplifier; Fig. 2 is a graph showing the relationship between input voltage and mean current drawn from the H. T. supply of a circuit like that of Fig. 1; Fig. 3 is the circuit of a voltage stabiliser and Fig. 4 is another form of voltage stabiliser including the amplifier circuit of Fig. 1.

In Fig. 1, a D. C. input voltage is connected at terminals 1 and 2 so as to be applied between trigger grid 3 and cathode 4 of a cold-cathode triode valve 5 by way of resistance 6. A condenser 7, connected as shown, is selected to be large enough to ensure firing of the triode 5 when the voltage at grid 3 reaches or exceeds its striking value. The H. T. voltage, applied between terminals 8 and 1, is made less than that at which the anode/cathode space of valve 5 would break down purely due to the influence of the anode potential and the anode resistor 9 is made large enough to ensure that the valve cannot remain in continuous conduction when it fires. Each time the valve conducts a condenser 10 discharges through it and a resistor 11 is provided to limit the current to a safe value. As the current passing through resistor 9 is inadequate to maintain the discharge in the tube, condenser 10 recharges through resistor 9 to the H. T. voltage. A condenser 12 is provided which is large compared with condenser 10, to average out the pulses of current through resistor 9.

If the time constant of resistor 9/condenser 10 is short enough to permit the voltage on the anode of valve 5 to reach the H. T. voltage after every discharge and before the valve strikes again then it can be shown that the period between successive pulses of current through the valve is dependent upon the values of resistor 6 and condenser 7 and the applied voltage between terminals 1 and 2. The condition that the anode voltage should recover to the H. T. voltage implies that the time constant resistor 9/condenser 10 is not larger than the time constant resistor 6/condenser 7. The characteristics of the amplifier described above are shown in the graph of Fig. 2 where the ordinate is the mean current drawn from the H. T. supply and the abscissa is the voltage connected at terminals 1 and 2. Graph 14 is obtained with a higher value of resistor 9 than used for graph 13 and graph 15 is obtained with a yet higher value of resistor 9. The point 16 is the striking voltage of the tube. The point 16 is subject to statistical variation depending upon chance ionisation of the gas in valve 5. As mentioned above the stability is improved by the use of a valve, such as a VX 8107, having a "keep-alive" electrode. Alternatively the stability may be improved by the use of a rectifier 17 and resistor 18 shown dotted in Fig. 1. In this modified arrangement the condenser 7 discharges through rectifier 17 each time the valve 5 fires. When this discharge quenches, the trigger grid 3 rises relatively rapidly towards the H. T. voltage on a time constant resistor 18/ capacity of rectifier 17 and stray capacities. The anode of the rectifier on the other hand rises on the time constant resistor 6/capacity 7 towards the applied voltage. Before the anode of rectifier 17 reaches the trigger grid striking voltage the trigger grid has reached its striking voltage and a small discharge from grid to cathode ensues so that the grid passes a small steady current which is insufficient to strike the main discharge but is sufficient to produce definite ionisation to eliminate unstable firing of the tube. The rectifier 17, preferably of the selenium miniature type, has a high reverse resistance, this being necessary in view of the value of resistor 18 which is of the order of 200 megohms. Smaller values of resistor 18 are not permissible as the steady current flowing in the grid would cause the valve to fire independently of the applied voltage.

Operation of the circuit of Fig. 1 as a voltage stabiliser is now described with reference to Fig. 3 which is of the parallel-stabiliser type, i. e. a portion of the output voltage is compared with a reference voltage and the difference between these voltages controls the current through a parallel stabiliser valve in such a way that the output voltage is stabilised at a certain value. Adjustment of the stabilised voltage in this type of stabiliser may be carried out by altering the comparison voltage or altering the reference voltage. By using a cold-cathode triode in a parallel-voltage stabiliser arrangement the striking voltage of the triode may be used as the reference voltage. The circuit shown in Fig. 3 has been used to stabilise within two volts at a selected point between 360 and 420 volts from a source developing an open circuit of 600–800 volts with a load current varying from zero to four micro-amps. Component sizes are shown in brackets in the description.

In Fig. 3 a cold cathode triode valve 19 has an anode 20, a "keep-alive" electrode 21, a trigger grid electrode 22 and cathode 23. The valve 19 has connected to it an anode load resistance 24 (1 M), a "keep-alive" current path including resistor 25 (100 M), a striking grid input connection 26 from a point in a potentiometer chain comprising resistor 27 (50 M), resistor 28 (100 M) and potentiometer 29 between a 155 volt line 30 and the earth line 31. A series resistor 32 (20 M) is provided in the H. T. line 33. The input is made between terminals 34, 35 and the stabilised output is taken from terminals 36, 37.

The valve 19 adjusts its mean current to such a value that the voltage drop across resistor 32 is just sufficient to maintain the output voltage at a constant value in the manner well-known with parallel stabilisers. The cathode of valve 19 is returned to the 155 volt line and facilities for changing the output voltage are provided, by returning the chain of resistors 27, 28 to an adjustable voltage. Condensers 38 (.005 µf.) and 39 (1 µf.) function in a similar manner to that of condensers 10 and 12 respectively of Fig. 1. Condenser 40 (270 pf.) is provided to ensure that the valve fires when its grid voltage exceeds the grid striking voltage.

In Fig. 4, the circuit of Fig. 1, shown by the dotted line 41, has been adopted as a voltage stabiliser. Input terminals 42, 43 and output terminals 44, 45 are provided together with a series resistor 46 and a chain of resistors 47, 48 and 49. The resistor 48 is adjustable and, together with other resistors of the chain, allows variation of the proportion of the output voltage fed back to effect adjustment of the output stabilised voltage.

Stabilisers according to the invention have a very useful application where the current through the stabiliser is of the order of 0–200 micro-amps and the output voltage is less than 500 volts, but this is not the limit of their useful range. A circuit such as that disclosed in Fig. 4 for example, has a constant and relatively low output impedance and does not suffer from the rather variable negative and positive resistance characteristics of the conventional regulator tubes when used in a current region below 200 micro-amps. The facility of easy adjustment of voltage over a small range avoids any difficulties due to variations in voltage from valve to valve. The ability of the circuit to maintain its performance down to currents of a few micro-amps assists in reducing wastage in power which is important in portable battery driven apparatus. In distinction to corona stabiliser tubes the stabiliser of the invention provides an output voltage that may be varied over a small range whilst maintaining a low output impedance.

I claim:

1. An amplifier circuit comprising a cold-cathode triode valve, a high tension source therefor, a trigger electrode input circuit including an input condenser, and a condenser connected to be dischargeable through a resistance from the high tension source, the resistance being of a size to prevent continuous discharge through said valve and the time-constant of said resistance and condenser being less than the time-constant of the input circuit to the trigger electrode of said valve, a very high value resistance connected between the trigger electrode and high tension positive and a selenium rectifier connected between the trigger electrode and the input condenser so that said condenser discharges through the rectifier when the valve fires, the high-value resistance being of size such that the current flowing through the cathode-trigger electrode space of the valve is inadequate to fire the valve, and means for demodulating the frequency-modulated current through the valve to derive an amplified direct current output signal of a magnitude changing in dependence upon said input signal level.

2. An amplifier circuit comprising a cold-cathode triode valve, a high tension source therefor, a trigger electrode input circuit and a condenser connected to be dischargeable between anode and cathode of said valve and chargeable through a resistance from the high tension source, the resistance being of a size to prevent continuous discharge through said valve and the time-constant of said resistance and condenser being less than the time-constant of the input circuit to the trigger electrode of said valve, and means comprising a condenser between high tension positive and high tension negative for demodulating the frequency-modulated current through the valve to derive an amplified direct current output signal of a magnitude changing in dependence upon said input signal level.

3. A parallel voltage stabilizer circuit comprising input and output terminals, a series resistance, means for comparing a fraction of the output terminal potential with a reference potential and shunt-connected means for drawing a current through said series resistance depending on the difference of potentials being compared, wherein said shunt-connected means comprises a cold-cathode triode valve having a trigger electrode input circuit and a condenser connected to be chargeable by said current through a second resistance and dischargeable between anode and cathode of said valve, the second resistance being of a size to prevent continuous discharge through the valve and the time-constant of said second resistance and condenser being less than the time-constant of the trigger electrode input circuit, and means for demodulating the frequency-modulated current through the valve, wherein said fraction of the output terminal potential is applied to the trigger electrode of the valve and wherein said reference potential is the trigger electrode striking potential of the valve.

References Cited in the file of this patent

UNITED STATES PATENTS

| | | |
|---|---|---|
| 1,898,046 | Geffcken | Feb. 21, 1933 |
| 2,006,737 | Gessford | July 2, 1935 |
| 2,020,917 | Stogoff | Nov. 12, 1935 |
| 2,071,958 | Watrous | Feb. 23, 1937 |
| 2,191,185 | Wolff | Feb. 20, 1940 |
| 2,201,166 | Germenshausen | May 21, 1940 |
| 2,233,045 | Bonner et al. | Feb. 25, 1941 |
| 2,372,432 | Keizer | May 27, 1945 |
| 2,391,801 | Schade | Dec. 25, 1945 |
| 2,574,207 | Christian | Nov. 6, 1951 |
| 2,607,897 | Fairbairn | Aug. 19, 1952 |
| 2,687,485 | Tirico | Aug. 24, 1954 |